(12) United States Patent
Goldenberg et al.

(10) Patent No.: US 9,481,096 B2
(45) Date of Patent: Nov. 1, 2016

(54) ROBOTIC ARM

(71) Applicant: Engineering Services Inc., Toronto (CA)

(72) Inventors: Andrew A. Goldenberg, Toronto (CA); Brent Bailey, Toronto (CA); Matthew Gryniewski, Mississauga (CA); Xiaojia He, Toronto (CA); Yi Yang, Toronto (CA)

(73) Assignee: ENGINEERING SERVICES INC., Toronto, ON (CA)

( * ) Notice: Subject to any disclaimer, the term of this patent is extended or adjusted under 35 U.S.C. 154(b) by 0 days.

(21) Appl. No.: 14/728,765

(22) Filed: Jun. 2, 2015

(65) Prior Publication Data

US 2015/0290817 A1 Oct. 15, 2015

Related U.S. Application Data

(63) Continuation of application No. 13/789,403, filed on Mar. 7, 2013, now Pat. No. 9,044,865.

(51) Int. Cl.
*B25J 18/02* (2006.01)
*B25J 19/00* (2006.01)
(Continued)

(52) U.S. Cl.
CPC ......... *B25J 18/02* (2013.01); *B25J 9/08* (2013.01); *B25J 17/00* (2013.01); *B25J 19/0029* (2013.01); *Y10S 901/23* (2013.01); *Y10T 74/20317* (2015.01)

(58) Field of Classification Search
CPC .............................. B25J 19/0041; B25J 19/0029
See application file for complete search history.

(56) References Cited

U.S. PATENT DOCUMENTS 5,101,681 A * 4/1992 Shpigel ............... B25J 17/0258
403/57
5,673,595 A 10/1997 Hui et al.
5,712,552 A * 1/1998 Hirai .................... B25J 19/0029
318/568.1

(Continued)

FOREIGN PATENT DOCUMENTS

CN 1876335 12/2006
CN 101579860 11/2009
CN 102862165 1/2013

OTHER PUBLICATIONS

E.T. Baumgartner, R.G. Bonitz, J.P. Melko, L.R. Shiraishi and P.C. Leger, "The Mars Exploration Rover Instrument Positioning System," Proceedings of the 2005 IEEE Aerospace Conference, Big Sky, MT, Mar. 2005.

(Continued)

*Primary Examiner* — Terence Boes
(74) *Attorney, Agent, or Firm* — Hill & Schumacher

(57) ABSTRACT

A robotic arm includes a first link and a first joint. The first link has internal link cables extending from one end to an opposed end thereof. The first joint is operably connected to the first link at one end thereof. The first joint has a hollow drive shaft, an off axis drive 121 and a first joint motor and first joint internal cables extending through the hollow drive shaft. The link cables and the first joint cables are operably connected. The robotic arm may further include a second joint operably connected to the first link. The second joint module has an active side, a passive side with electronic connectors, second joint internal cables, and a second joint motor and the active side is mechanically connected to the link and the electronic connectors of the passive side are operably connected to the link cables.

17 Claims, 14 Drawing Sheets

(51) Int. Cl.
  *B25J 17/00*  (2006.01)
  *B25J 9/08*   (2006.01)

(56)         References Cited

U.S. PATENT DOCUMENTS 6,394,998 B1    5/2002  Wallace et al.
  2007/0208458 A1* 9/2007 Harada ............... B25J 17/0283
                                                   700/245
  2010/0192720 A1  8/2010  Helmer et al.
  2010/0242660 A1  9/2010  Offer et al.
  2011/0296944 A1 12/2011  Carter et al.
  2012/0192671 A1  8/2012  Riwan et al.
  2012/0204670 A1  8/2012  Ryland et al.
  2013/0068060 A1  3/2013  Xu et al.
  2014/0026705 A1  1/2014  Sasaki et al.
  2014/0060233 A1  3/2014  Gomi et al.

OTHER PUBLICATIONS

P. Schenker et al., "Dexterous Robotic Sampling for Mars in-situ Science", Publication date Oct. 14, 1999, conference paper International Society for Optical Engineering (SPIE); Pittsburgh, PA, United States.

Schunk, Servo-electric rotary pan-tilt actuator Type PW 70-90 Assembly and operating manual, Trans., 02.01 ed., Lauffen/Neckar, Schunk GmbH & Co. KG, Aug. 14, 2012. Print.

* cited by examiner

FIG. 4

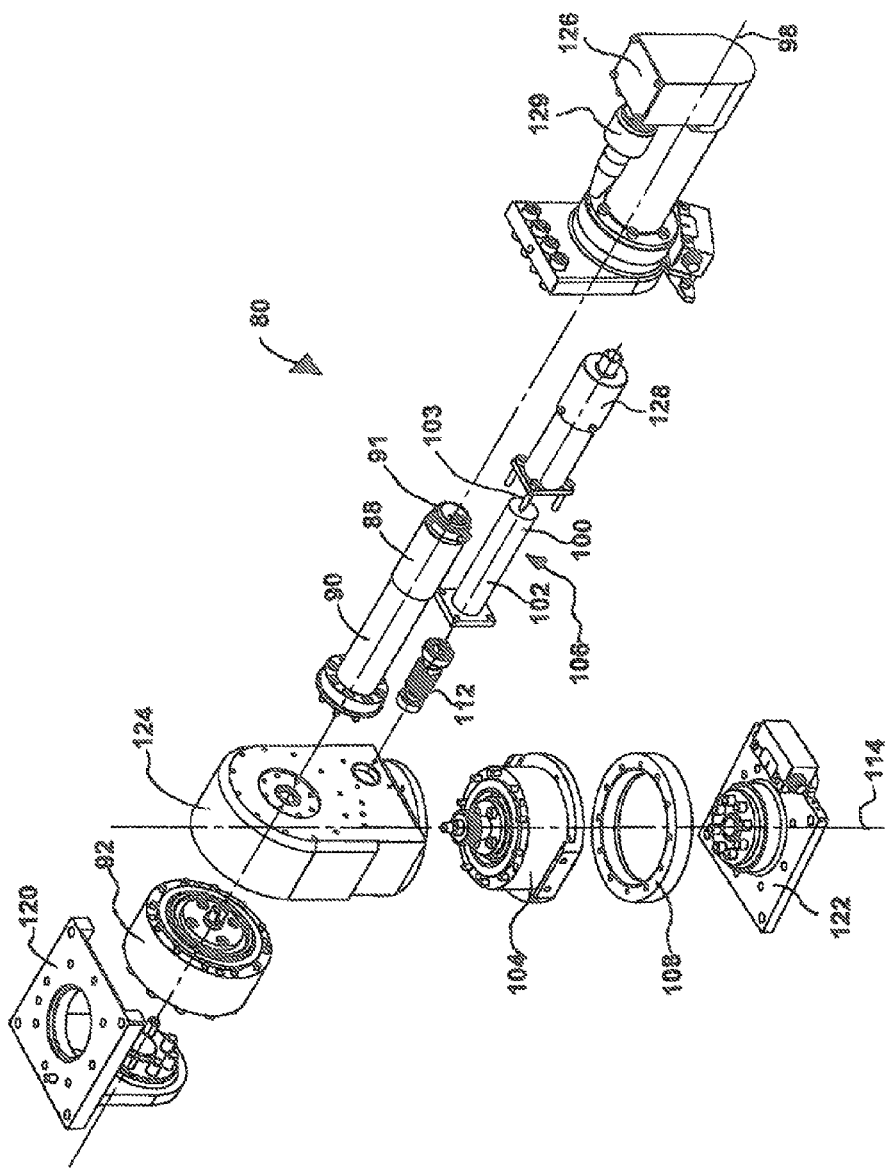

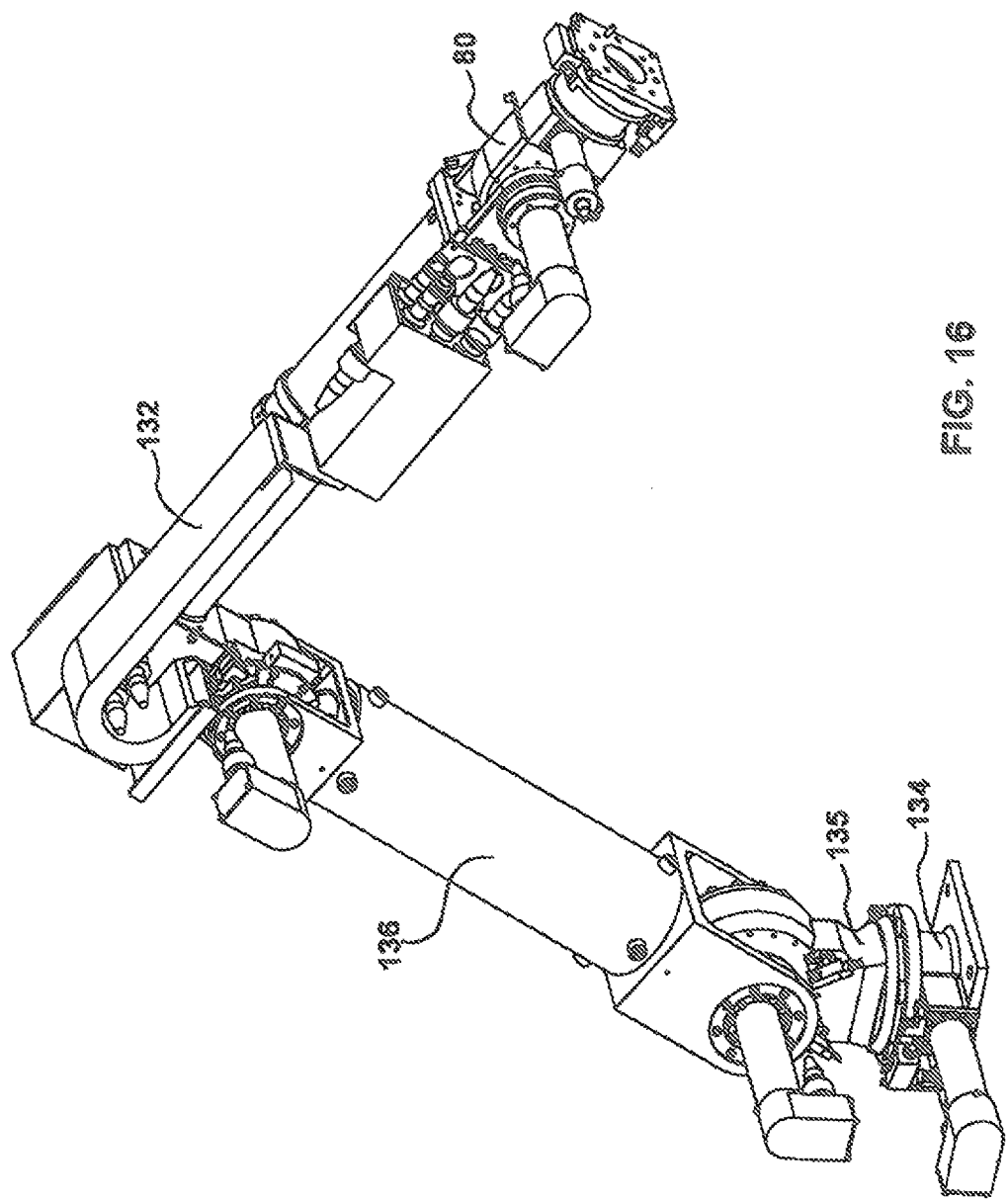

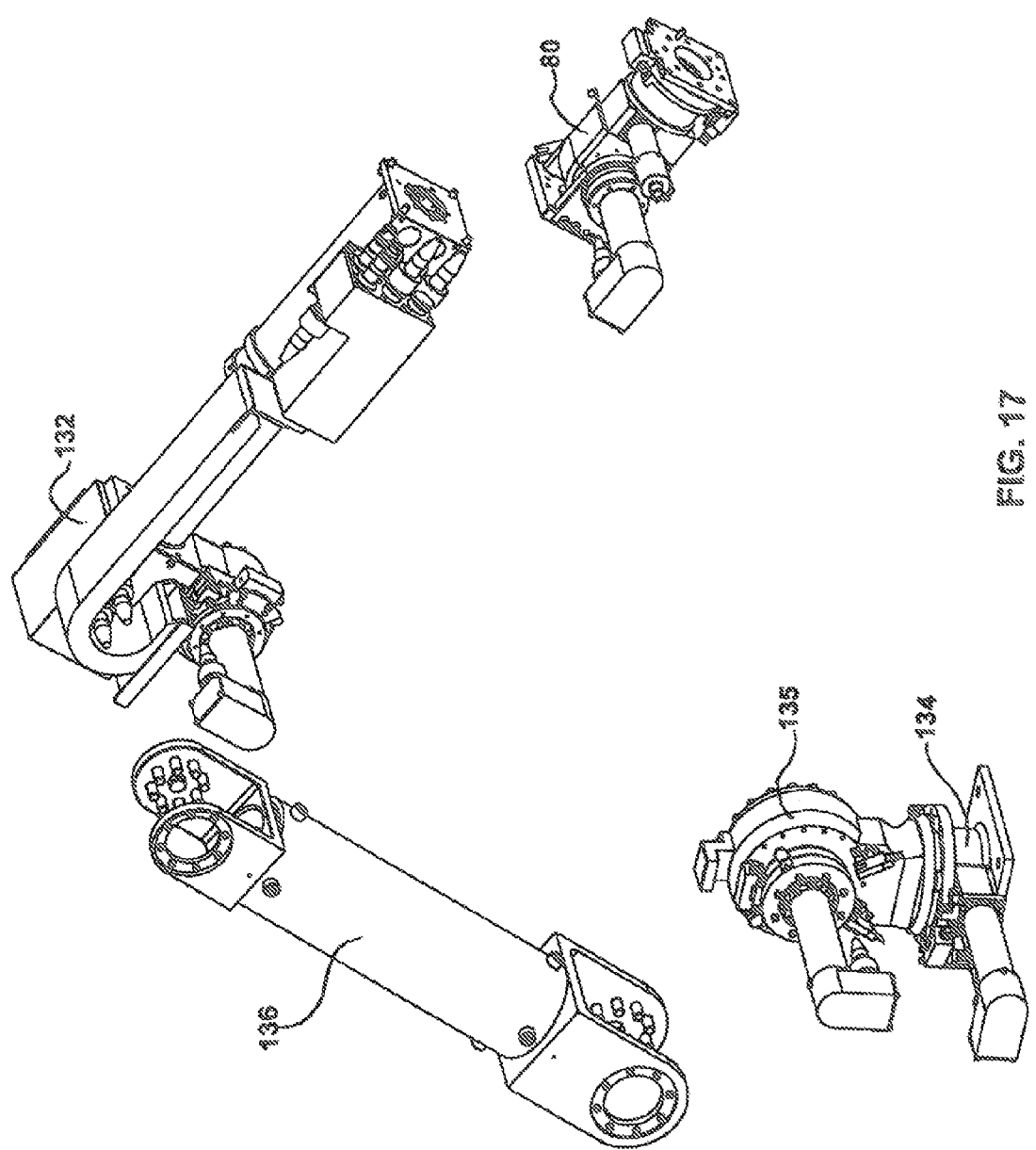

ROBOTIC ARM

FIELD OF THE DISCLOSURE

This disclosure relates to robotic arms and in particular robotic arms with internal cables.

BACKGROUND

Robot joints used in robotic arms are well known. However, when joints and arms are to be used in certain applications constraints are introduced in the specifications that are not generally present in general applications. For example the payload to weight ratio is very important in space and planetary applications and mobile robot applications. As well, size constraints may be very important in manufacturing and mobile robot applications. Any design of modern robot needs to consider: low weight, high payload, long reach, kinematic dexterity, high accuracy and repeatability, and low cost.

Accordingly most of the above considerations can be addressed by the combination of two joints in a single module which would be advantageous over separate first joint and second joints. A combination two joint module may provide advantages in regard to a compact size, low weight, high payload, and high accuracy and repeatability. Such joints are particularly useful in robotic arms. As well, modular robotic arms having internal cables are advantageous over conventional robotic arms.

SUMMARY

A two joint module includes a module housing, a first joint and a second joint. The module housing has a structural support portion. The first joint has a first motor and a first motor axis and a first joint axis. The second joint has a second motor and a second motor axis and a second joint axis. The second joint axis is at an angle to the first joint axis. The first joint is attached to the structural support portion and the second joint is attached to the structural support portion.

The first joint may be a pitch joint. The second joint may be one of a roll joint and a yaw joint. The second joint may be a prismatic joint.

The second motor may be perpendicular to the second joint axis. The first motor axis and the first axis may be parallel.

Each joint may include a gearhead and a drive operably attached to the respective motor. The drive may be a harmonic drive. Each motor may include absolute encoders and incremental encoders. Each motor may be capable of measuring speed and current. The two joint module may include torque sensors. Each joint of the two joint module may be a low power, high torque joint.

One of the first and second motor may be include angled gearing such the second joint axis is at an angle to the first joint axis. The first joint axis may be orthogonal or at right angles to the second joint axis. The right angle gearing may be one of a worm gear and a hypoid gear.

The module housing may act as an electromagnetic shield. The module housing may include a module housing box and each motor may be external to the module housing box. The module housing may include motor housing.

The first joint and second joint may be configured to be reversible.

Each motor may be operably connected to cables that are internal to the module housing. One of the first joint and second joint may have an active side and a passive side of the housing and the other of the first joint and second joint may have a hollow central axis and the cables may pass through the passive side of the housing of one joint and the hollow central axis of the other joint.

A two joint module includes a module housing, a first joint and a second joint. The first joint has a passive side and an active side and has a first motor. The second joint has a hollow central axis and an off axis drive and has a second motor. Internal cabling runs through the passive side of the first joint and through the hollow central axis of the second joint.

Each joint may include electronics and the electronics are capable of being connected in series and the cables are operably connected to the electronics and operably connected to the motors.

The first motor and gearhead may be a combination motor and gearhead. The harmonic drive may be internal to the combination motor and gearhead.

A robotic arm includes a first link and a first joint. The first link has internal link cables extending from one end to an opposed end thereof. The first joint is operably connected to the first link at one end thereof. The first joint has a hollow drive shaft, an off axis drive and a first joint motor and first joint internal cables extending through the hollow drive shaft. The link cables and the first joint cables are operably connected.

The robotic arm may further include a second joint operably connected to the first link. The second joint module has an active side, a passive side with electronic connectors, second joint internal cables, and a second joint motor and the active side is mechanically connected to the link and the electronic connectors of the passive side are operably connected to the link cables.

The robotic arm may further include a second link operably connected to one of the first joint and the second joint. The first joint and the second joint may be a combination two joint module.

The robotic arm may further including a third joint and a fourth joint each operably connected to the second link. The third joint and the fourth joint may be a combination two joint module.

The robotic arm may further include a fifth joint and a sixth joint. The fifth joint and the sixth joint may be a combination two joint module.

Further features will be described or will become apparent in the course of the following detailed description.

BRIEF DESCRIPTION OF THE DRAWINGS

The embodiments will now be described by way of example only, with reference to the accompanying drawings, in which:

FIG. 4 is a cross sectional view of the two joint module of FIG. 2 taken along line 4-4;

FIG. 13 is a blown apart view of the two joint module of FIG. 9;

FIG. 16 is a perspective view of an arm including the two joint modules of FIGS. 9 and 15; and FIG. 17 is a perspective blown apart view of the arm of FIG. 16.

DETAILED DESCRIPTION

Figure 1:
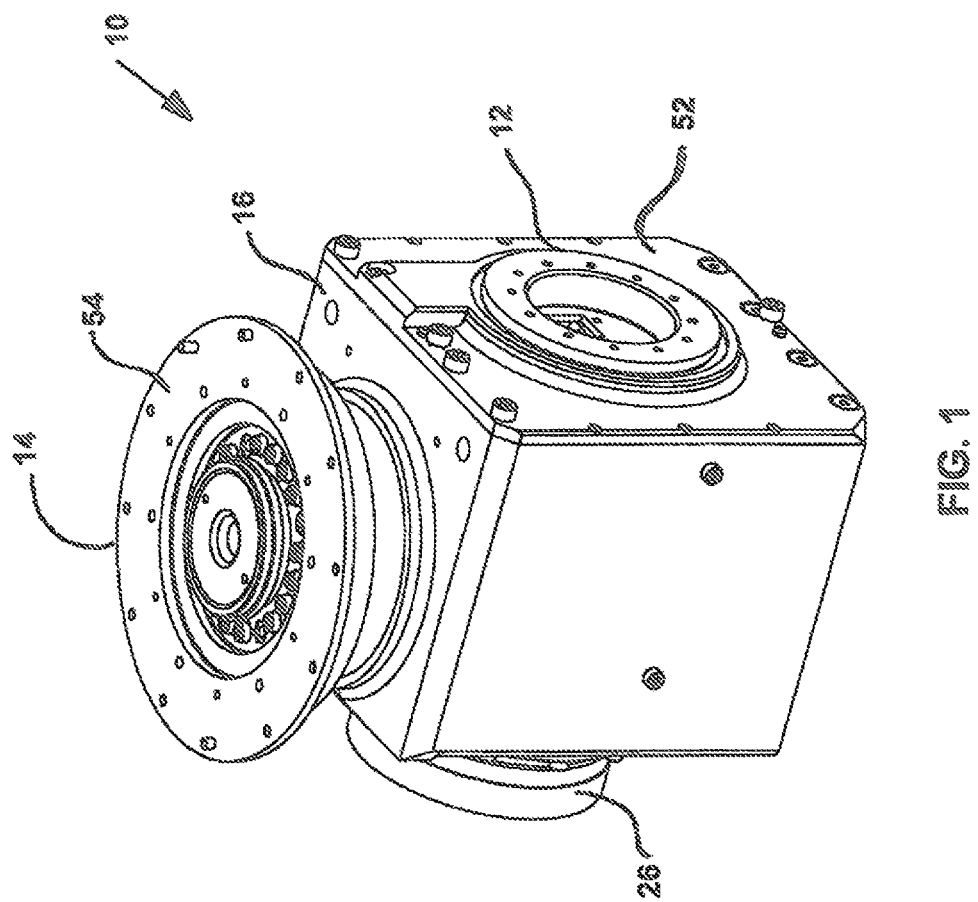
FIG. 1 is a perspective view of an embodiment of a two joint module which may be used as a wrist joint.
Figure 2:
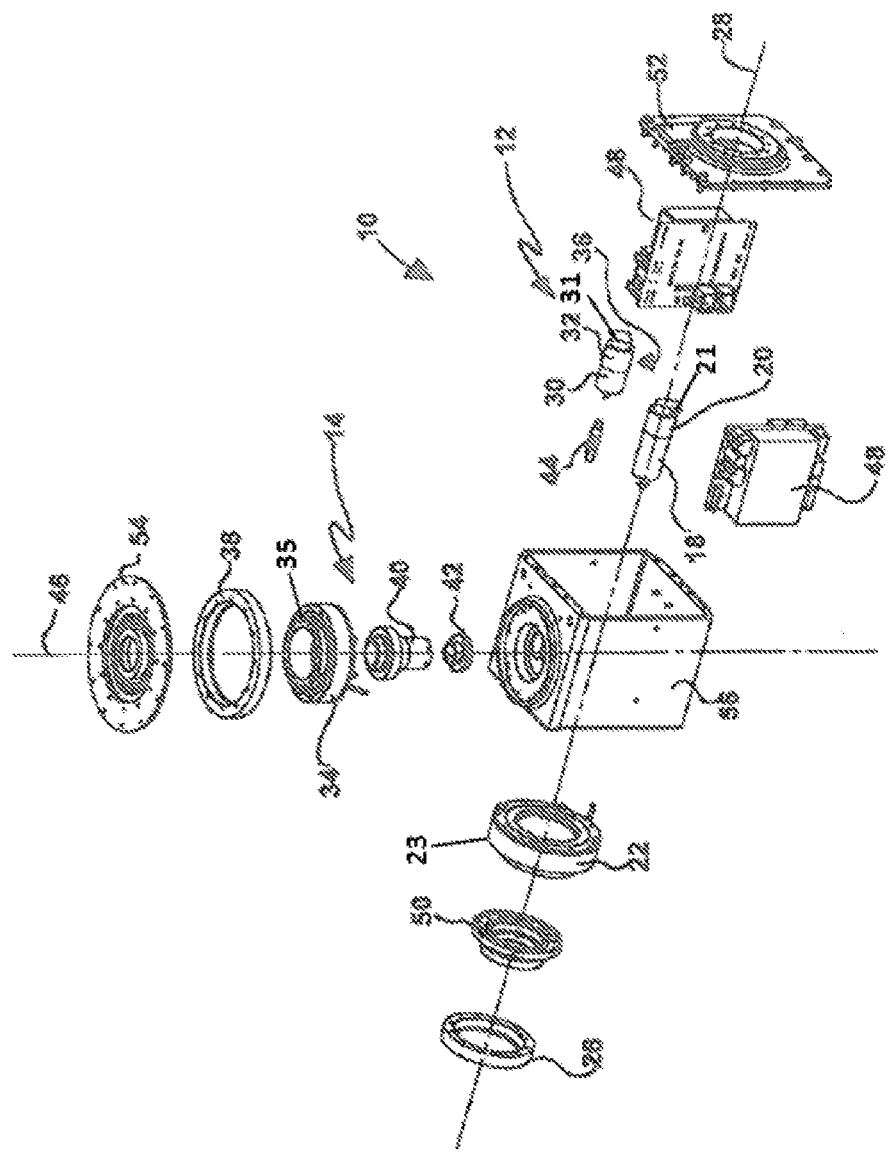
FIG. 2 is a blown apart view of the two joint module of FIG. 2
Figure 3:
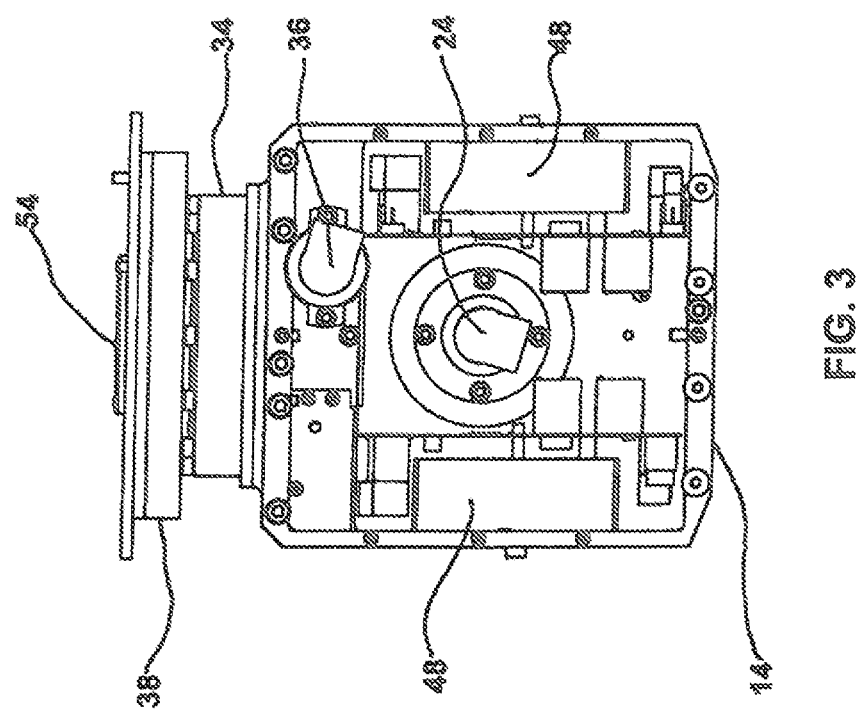
FIG. 3 is cross sectional view of the two joint module of FIG. 2 taken along line 3-3
Figure 4:
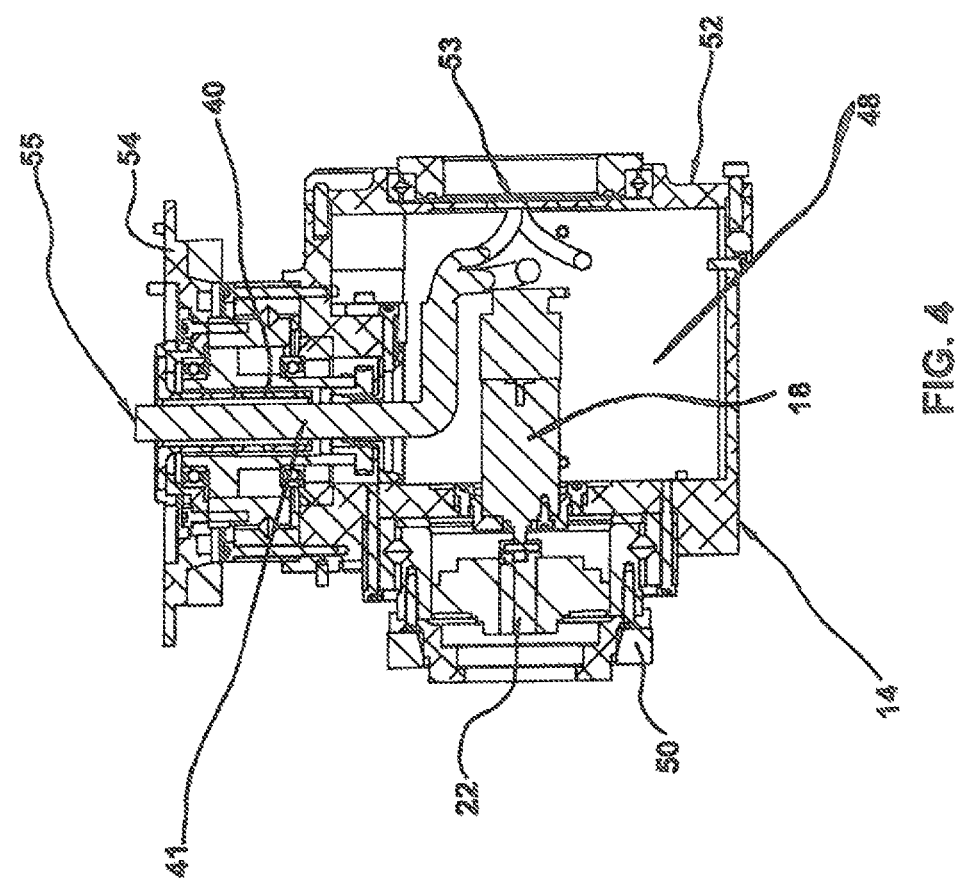

Referring to FIGS. 1 to 4, a two joint module is shown generally at 10. Module 10 includes a first joint 12, a second joint 14 and a module housing 16. The first joint 12 has a first joint axis 28 and the second joint 14 has a second joint axis 46 and the first axis 28 is generally orthogonal to the second axis 46. However, the angle between the two joints need not be orthogonal rather it could be at another angle depending on the design constraints. Typically the first joint is a pitch joint and the second joint is a roll joint or yaw joint.

The first joint 12 includes a first motor 18, a first gearhead 20 and a first drive 22. By way of example the first drive 22 is a harmonic drive. The first motor 20 and first gearhead 18 may be incorporated in the same unit 24 as shown herein. The first motor and gearhead may also include an incremental encoder 21. The motor gearhead is a speed reducer to reduce the power required to operate the first module. The gearhead has a reduction ratio of 20584:1. The use of the gearhead provides for the option to use smaller, lighter and lower power motors. The incremental encoder 21 measures relative rotational position of the motor and in turn by determining the rate of change of the rotational position the speed of the motor is determined. The position of the motor is determined prior to the gearhead. The first drive 22 may include an integrated torque sensor 23 which measures the output torque that is applied after all of the gearing. The first joint also includes an absolute encoder 26 which determines the rotational position of the output after all of the gears. The absolute encoder is used to determine the relative rotational position of the outer link with respect to the inner link.

The first joint 12 has a first motor axis and a first joint axis 28. The first motor 20, first gearhead 18, first drive 22 and first absolute encoder 26 are concentric with the first joint axis 28.

The second joint 14 includes a second motor 32, a second gearhead 30 and a second drive 34. The second motor or drive 34 may be a harmonic drive. The second motor 32 and second gearhead 30 may be incorporated in the same unit 36 as shown herein. The second motor and gearhead may also include an incremental encoder 31. The incremental encoder 31 measures relative rotational position of the motor and from the rate of change of the relative rotational position the speed of the motor is determined. The position of the motor is determined prior to the gearhead. The second drive 34 may include an integrated torque sensor 35 which measures the output torque that is applied after all of the gearing. The second joint also includes an absolute encoder 38 which determines the rotational position of the output after all of the gears. The absolute encoder is used to determine the rotational position of the link.

The second joint 14 includes a hollow drive shaft 40 and angled gearing that allows for internal cabling 41. A worm gear 42 and worm 44 connect the second motor and gearhead combination 36 to the drive shaft 40. This allows the second motor 32, the second motor axis and gearhead combination 36 to be positioned at an angle to the second joint axis 46. The angle may be perpendicular but it will be appreciated by those skilled in the art that the different angles may be chosen depending on the design constraints for the joint. The positioning of the motor and gearhead combination 36 in this fashion allows for a compact two joint module.

The second joint 14 has a second joint axis 46. The second drive 34, second absolute encoder 38 and hollow drive shaft 40 are concentric with the second axis 46. The second drive 34 may be a harmonic drive. The second drive or motor 34, second motor axis and gearhead combination 36 are perpendicular to second joint axis 46. The second motor axis of the second motor and gearhead combination 36 is parallel to the first motor axis of the first motor and gearhead combination 24.

Electronic modules 48 are operably connected to each of the first joint 12 and the second joint 14. The electronic modules 48 are operably connected to a control unit (not shown). The electronic modules 48 receive information from the control unit in regard to the desired movement of the joint and control the first motor 18 and second motor 30 accordingly. Each electronic module 48 includes a torque sensor amplifier to increase strength of the output signal from the torque sensors. Each electronic module 48 includes interfaces for all of the sensors such as the incremental encoders, absolute encoder, and output from torque sensor amplifier, and is capable of digitizing all sensor information. Each electronic module 48 includes power connections.

The module housing 16 includes a first housing cover with electronic connections 53. A first output plate 50 is operably attached to the output of the first drive 22. The output plate 50 is adapted for mechanical external connections and is movable relative to the module housing 16 and output plate 50 is the active side of the housing. The first housing cover 52 with electronic connections 53 is for the joint modules interfaces for power and communications and is used for positioning the link which is attached to the module 10 and first housing cover is the passive side of the housing. The second joint 14 has a combined second output plate 54 and electronic connections 55. The active first output plate 50, passive first housing cover with electronic connections 53 and the second output plate, together with the hollow drive shaft 40 of the second joint 14 allows for internal cabling. However it will be appreciated that the first joint could have a hollow drive shaft and the second joint could have an active and a passive side. The module housing 16 also includes a housing box 56. The module housing box 56 is robust enough to transmit forces and torques and the module housing box is a structural support portion and first joint 12 and second joint 14 are attached thereto. As well, the module housing 16 enclosures the electronics and motors and protects them from external environment. The module housing 16 acts as an electromagnetic shield. The module housing 16 is made from metal and is conductive. The electronics modules 48 are enclosed by the housing 16. The housing 16 provides electromagnetic shielding.

Figure 5:
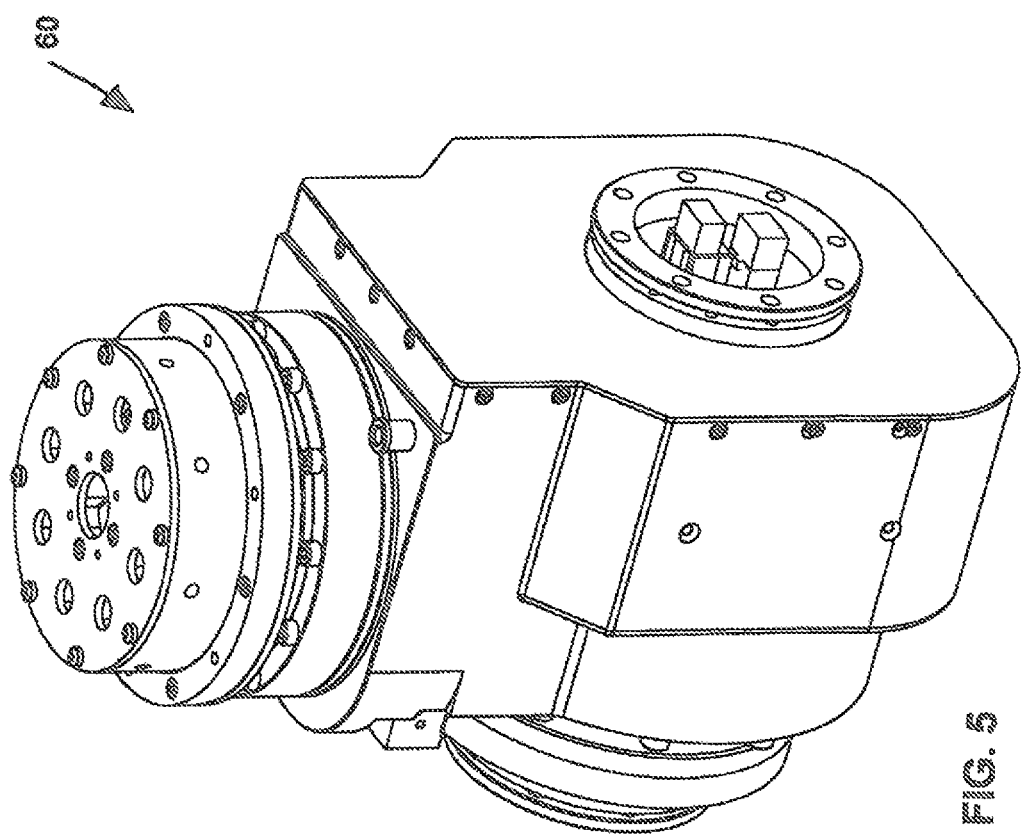
FIG. 5 is a perspective view of an alternate embodiment of a two joint module which may be used as an elbow joint.
Figure 6:
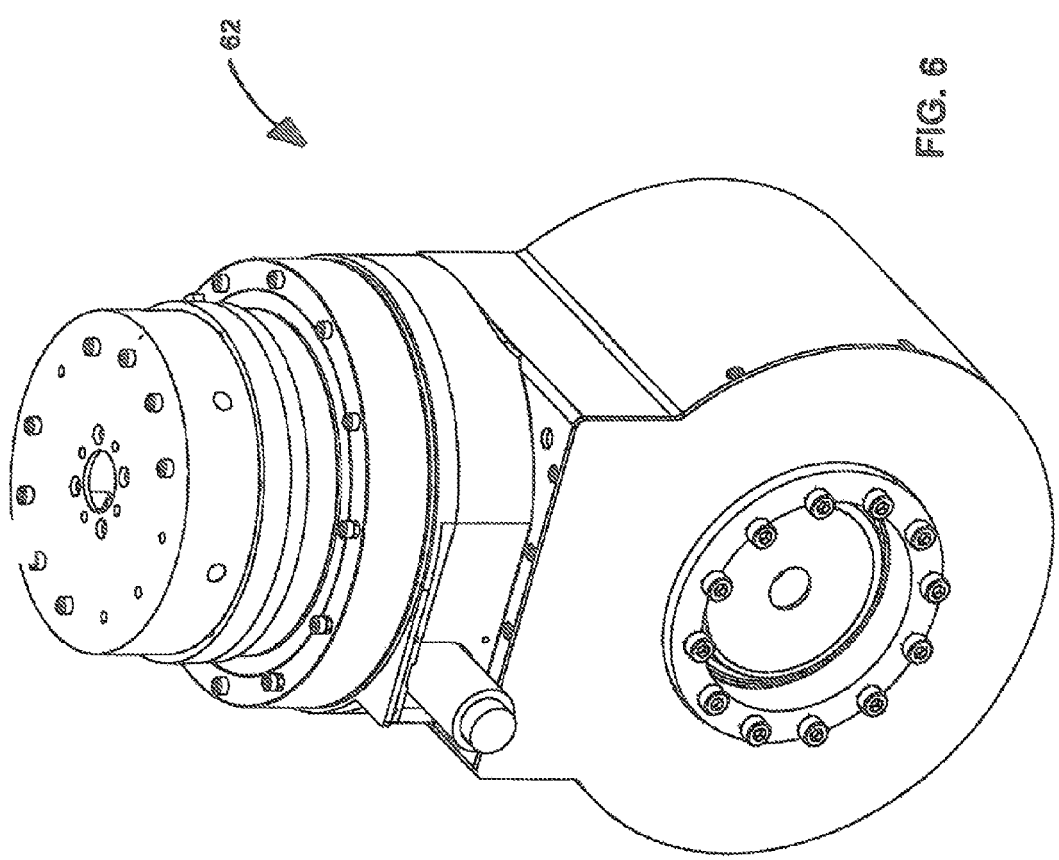
FIG. 6 is perspective view of an alternate embodiment of a two joint module which may be used as a shoulder joint.
Figure 7:
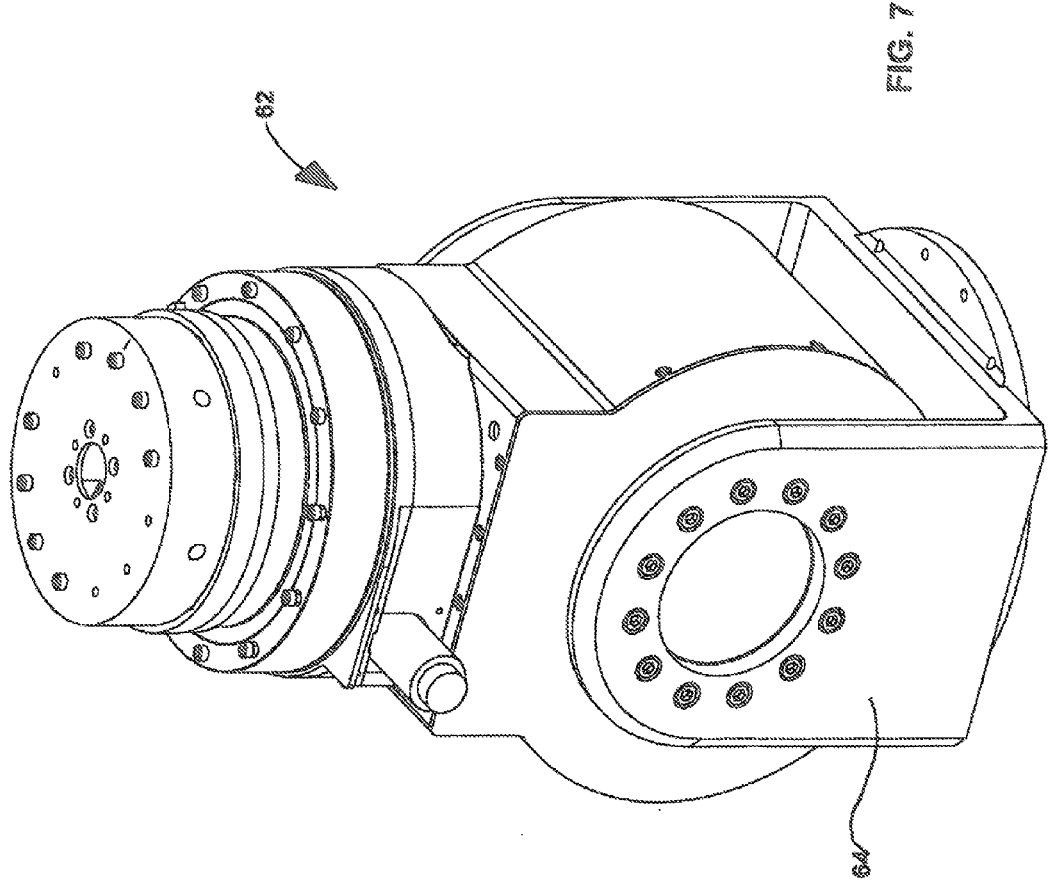
FIG. 7 perspective view of an alternate embodiment of a two joint module similar to that show in FIG. 6 but also including a fork connector.
Figure 8:
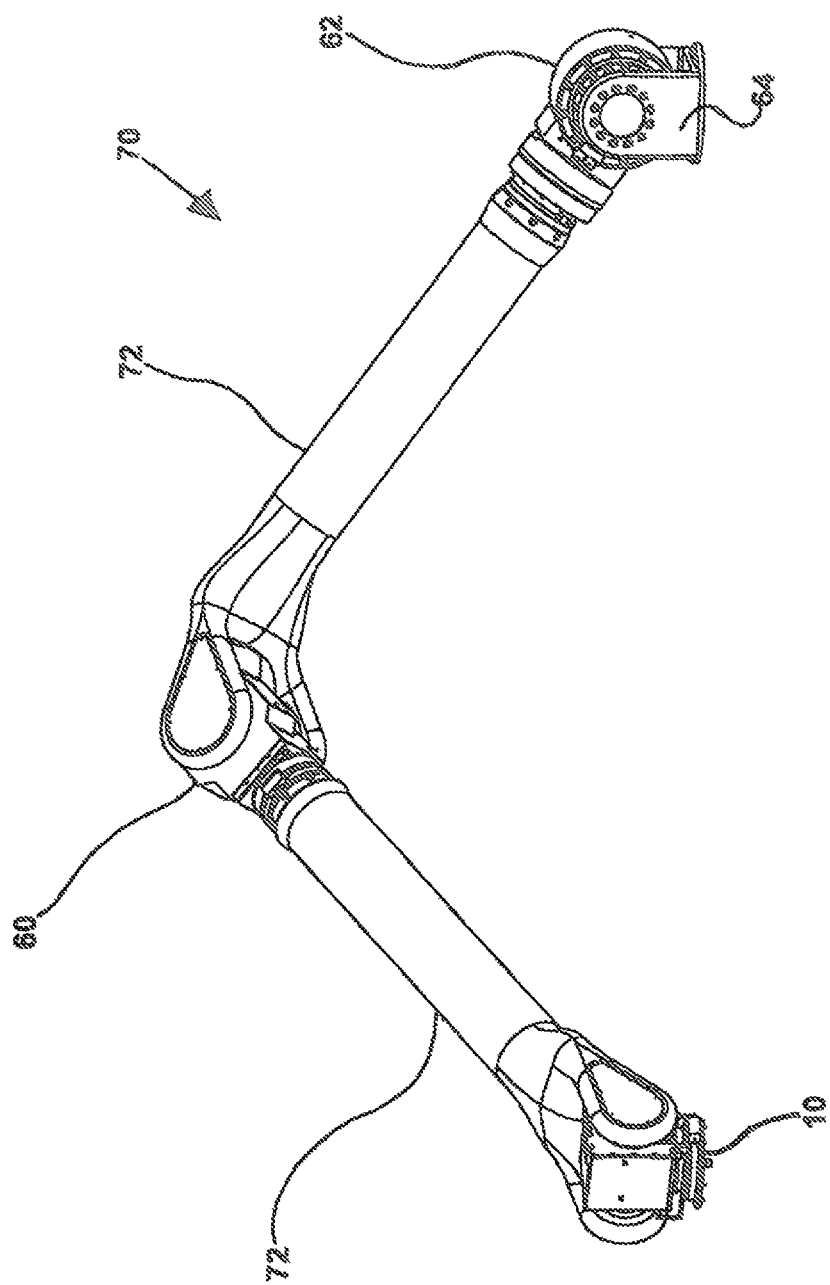
FIG. 8 is a perspective view of an arm assembly including the two degree of freedom joins shown in FIGS. 1, 5 and 7.
Figure 9:
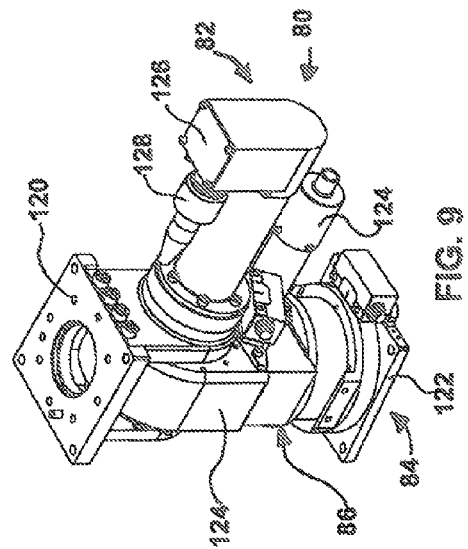
FIG. 9 is a perspective view of an alternate embodiment of a two joint module.
Figure 12:
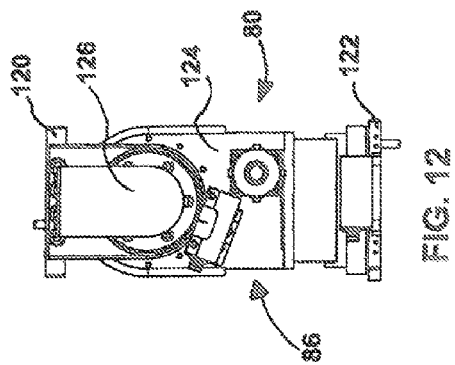
FIG. 12 is a front view of the two joint module of FIG. 9.
Figure 10:
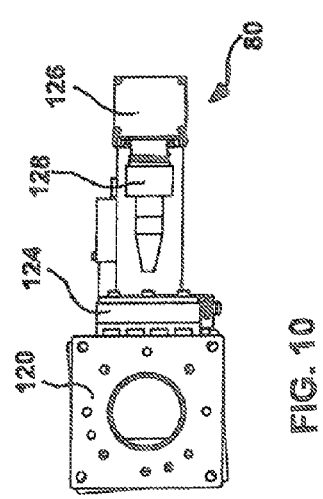
FIG. 10 is a top view of the two joint module of FIG. 9.
Figure 11:
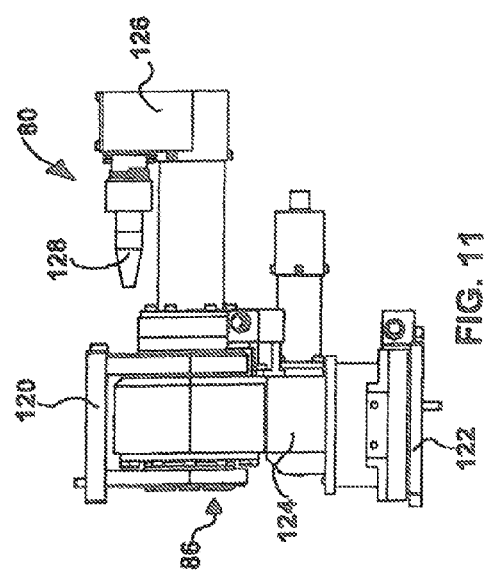
FIG. 11 is a side view of the two joint module of FIG. 9.
Figure 14:
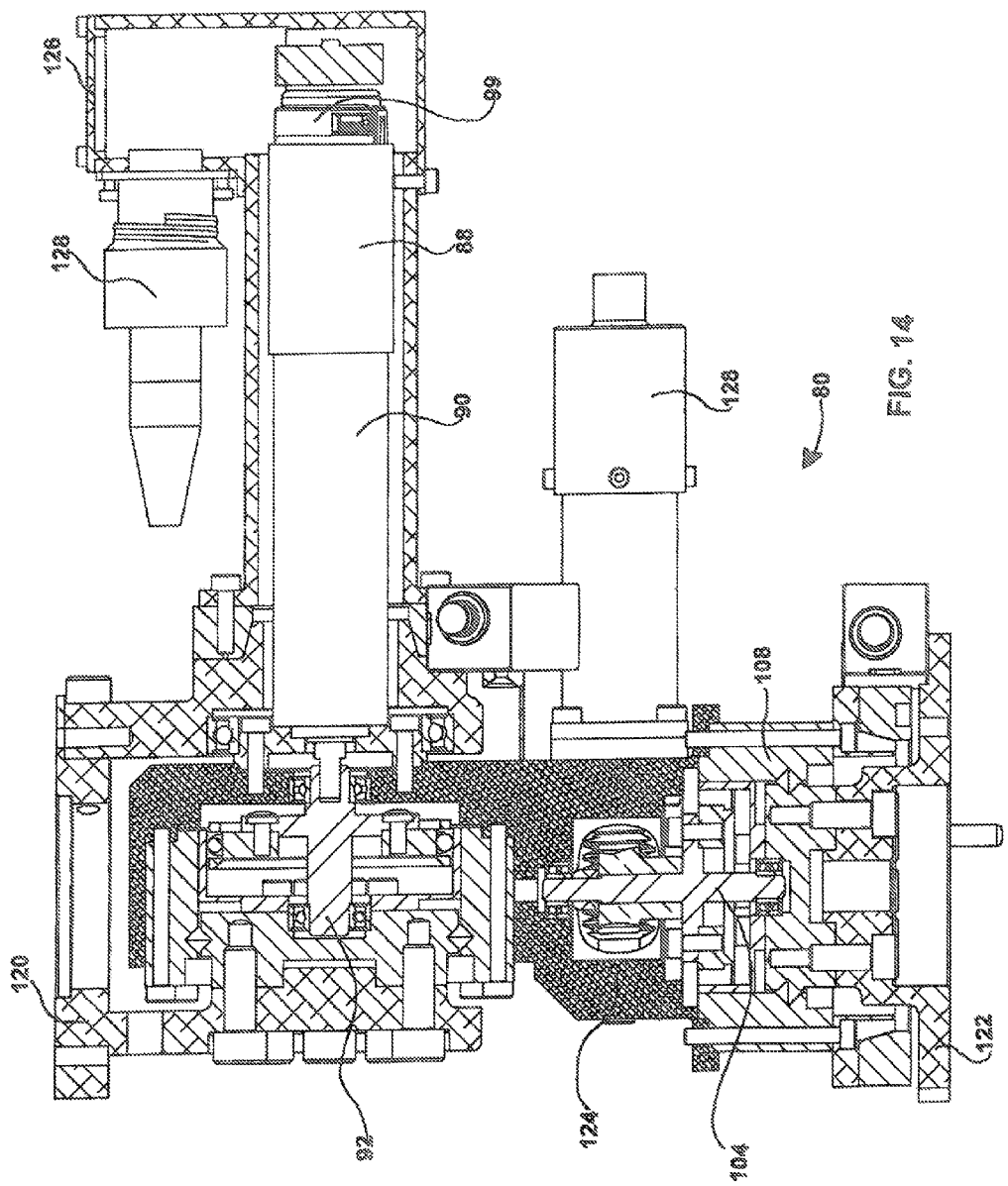
FIG. 14 is a cross sectional view of the two joint module of FIG. 9.

The embodiments of the two joint module 10 shown in FIGS. 1 to 4 are for a small relative to the other joints shown in arm 70 in FIG. 8 and joint module 10 may be used as a wrist module. FIG. 5 shows a medium sized embodiment of a two joint module 60 which is similar to that shown in FIGS. 1 to 4 but is somewhat larger and may be used as an elbow module. Since the elbow joint 60 has a greater distance from the payload, the elbow joint 60 is required to generate greater torques and thus requires larger motors and drives. FIG. 6 show a larger sized embodiment of a two joint module 62 that is similar to modules 10 and 60 but larger and may be used as a shoulder module. FIG. 7 is a larger module similar to that shown in FIG. 6 but further including a fork connector 64. Joint module 62 includes larger motors and drives than those of modules 10 and 60 and can generate higher torques. The electronics are configured so that the joint described herein with internal cabling are capable of being connected in series.

By way of example only the chart below shows the torques that can be generated by the specific joints shown herein. It will be appreciated that the motor size and gear ratios can be varied to achieve the specific torque that is required for a specific application.

| JOINT | MOTOR POWER (W) | GEAR RATIO | TORQUE |
|---|---|---|---|
| Module 62 | | | |
| Shoulder First Joint | 50 | 35652:1 | 826 |
| Shoulder Second Joint | 25 | 39243:1 | 367 |
| Module 60 | | | |
| Elbow First Joint | 25 | 37226:1 | 334 |
| Elbow Second Joint | 5 | 23085:1 | 71 |
| Module 10 | | | |
| Wrist First Joint | 5 | 20584:1 | 65 |
| Wrist Second Joint | 5 | 21309:1 | 42 |

As is well known in the art, joints are typically used in conjunctions with links to form a robot arm. The configuration of each robot arm can vary greatly depending on the design specifications which typically include such things as reach, weight of payload to weight of arm, operational environment, dexterity, human machine interfaces, accuracy and repeatability, and control methods. An example of an arm which uses the joint modules of FIGS. 1 to 7 is shown in FIG. 8. Arm 70 includes two joint module 10 as the wrist, two joint module 60 as the elbow and two joint module 62 with fork connector 64 as the shoulder. The modules are connected with links 72. As can be seen from the drawing one advantage of these joints is that there is no external cabling. This is advantageous as it reduces the risk of the cabling getting caught on some unknown projection. Note that in the embodiments shown in FIGS. 1 to 8 the joints have internal cabling. As described above, since the housing 16 provides electromagnetic shielding the cables can be lighter and more bendable since the cables do not need to include shielding or shielded connectors.

The modules can be used with links 72 to form a multi degrees of freedom robotic arm 70. One embodiment of the arm 70 has six degrees of freedom and a reach of 2250 mm. The arm has a mass of 38 kg and a payload capacity of 20 kg. The arm consists of a fork connector 64, shoulder module 62, lower link 72, elbow module 60, upper link 72 and a wrist module 10.

Referring to FIGS. 9 to 16, a two joint module is shown generally at 80. Module 80 includes a first joint 82, a second joint 84 and a module housing 86.

The first joint 82 includes a first motor 88, a first gearhead 90 and a first drive 92. By way of example the first drive may be a harmonic drive. The first motor 88 and first gearhead 90 may be incorporated in the same unit 94 as shown herein. The first motor and gearhead may also include an incremental encoder 91. The incremental encoder 91 measures relative rotational position of the motor and from the rate of change of the relative rotational position the speed of the motor is determined. The position of the motor is determined prior to the gearhead. The first joint also includes an absolute encoder 96 which determines the rotational position of the output after all of the gears. The absolute encoder is used to determine the position of the link.

The first joint 82 has a first joint axis 98. The first motor 88, first gearhead 90, first incremental encoder 91, first drive 92 and first absolute encoder 96 are concentric with the first axis 98. The first motor 88 has a first motor axis.

The second joint 84 includes a second motor 100, a second gearhead 102, a second incremental encoder 103 and a second drive 104. The second drive or motor 104 may be a harmonic drive. The second motor 100, second gearhead 102 and second incremental encoder 103 may be incorporated in the same unit 106 as shown herein. The incremental encoder 103 measures relative rotational position of the motor and from the rate of change of the relative rotational position the speed of the motor is determined. The position of the motor is determined prior to the gearhead. The second joint also includes an absolute encoder 108 which determines the rotational position of the output after all of the gears. The absolute encoder is used to determine the position of the link. A worm gear 112 connects the second motor, gearhead and incremental encoder combination 106 to the second drive 104. This allows the motor and gearhead combination 106 to be positioned perpendicular to the second joint axis 114. The positioning of the motor and gearhead combination 106 in this fashion allows for a compact two joint module.

The second joint 84 has a second axis 114. The second drive or motor 104 has a second motor axis. The second drive 104 and second absolute encoder 108 are concentric with the second axis 114. The second motor, gearhead and incremental encoder combination 106 are perpendicular to second axis 114. The second axis of the second motor, gearhead and incremental encoder combination 106 is parallel to the first axis of the first motor, gearhead and incremental encoder combination 98.

Electronic modules are operably connected to for each of the first joint 82 and the second joint 84. The electronic modules are located in a control unit (not shown). The electronic modules transmit information in regard to the movement of the joint and control the first motor 88 and second motor 100 accordingly. Each electronic module includes interfaces for all of the sensors such as the incremental encoders, absolute encoder, and output from torque sensor amplifier, and is capable of digitizes all sensor information. Each electronic module includes power connections.

The module housing 86 includes first output plate 120 and a second output plate 122. The first output plate 120 and second output plate 122 are adapted for mechanical external connections. The module housing 86 also includes a housing box 124. The housing box 124 acts as a structural support portion and first joint 82 and second joint 84 are attached thereto. The module housing 86 also includes a first motor cover 126 and a second motor cover 128. The first motor cover 126 also includes and external electronic connector 129. The module housing 86 is robust enough to transmit forces and torques. As well, the module housing 86 encloses the electronics and motors and protects them from external environment. The module housing 86 acts as an electromagnetic shield. The module housing 16 is made from metal and is conductive. The electronics modules 48 are enclosed by the housing 16. The housing 16 provides electromagnetic shielding.

Module 80 is different from those described above in that it is designed for external cabling (not shown).

Figure 15:
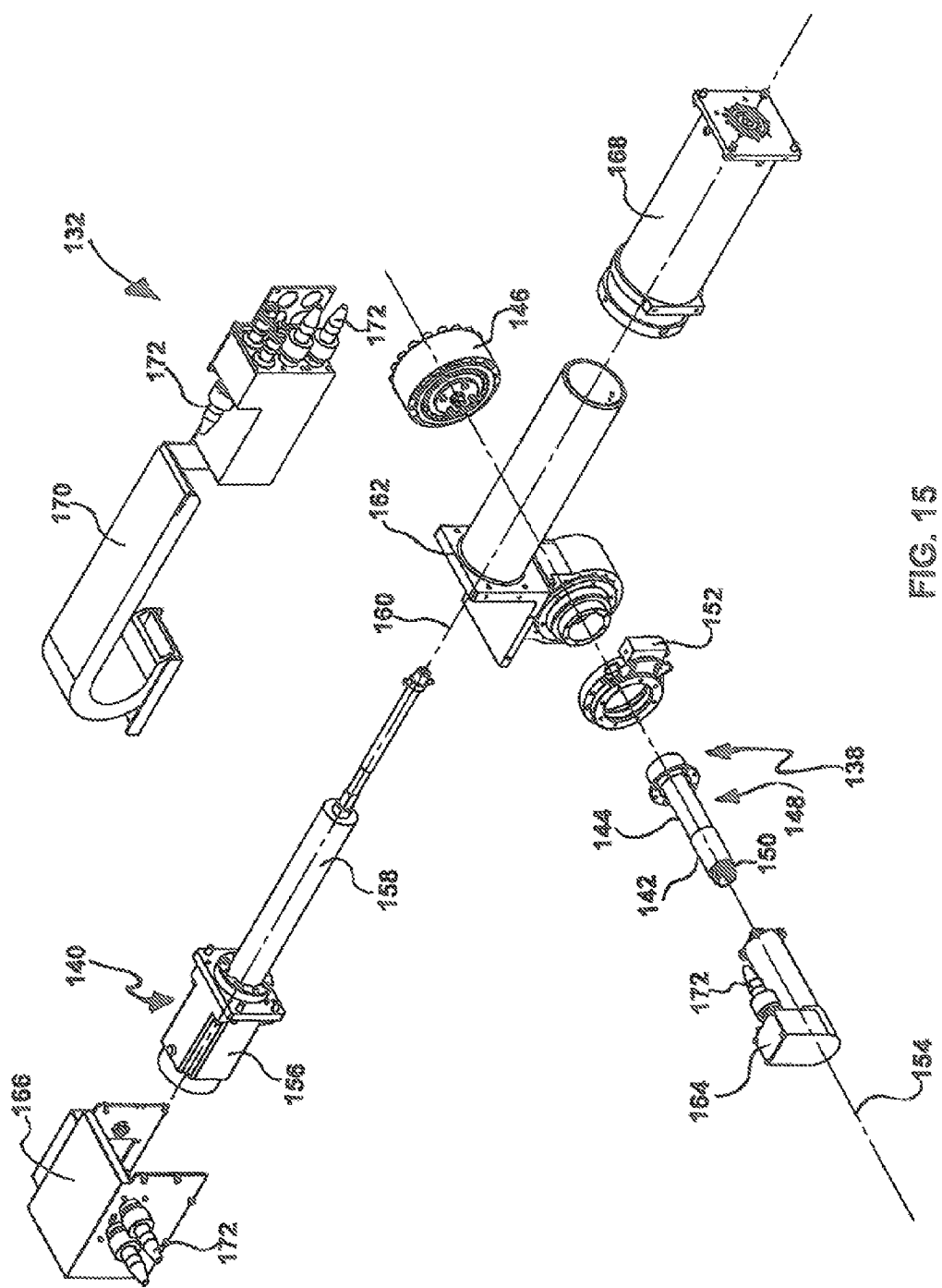
FIG. 15 is a blown apart view of a two joint module which includes a roll joint and a prismatic joint.

Two joint module 80 may be used as part of a robotic arm 130 as shown in FIGS. 15 and 16. Module 80 is used herein as a wrist module. Module 80 may be modified to be used as an elbow module 132. As well, module 80 may be scaled up to accommodate different loads.

Elbow module 132 is a two joint module that includes a first joint and a prismatic or linear joint. Module 132 is used herein as an elbow module. Module 132 is an alternative implementation of a two joints. Module 132 may be modified to be used as a wrist module 80 or a shoulder module 134. The first joint of module 132 may be modified and implemented as the first joint in combination with a second joint. A prismatic or linear joint of module 132 may be modified and implemented with second joint. Module 132 shares a common structural element in which both the first joint and the prismatic are attached.

More specifically two joint module 132 includes a first joint 138 and a linear or prismatic joint 140. The first joint 138 includes a first motor 142, a first gearhead 144 and a first drive 146. By way of example the first drive 146 may be a harmonic drive. The first motor 138 and first gearhead 140 may be incorporated in the same unit 148 as shown herein. The first motor and gearhead may also include an incremental encoder 150. The incremental encoder 150 measures relative rotational position of the motor and from the rate of change of the relative rotational position the speed of the motor is determined. The position of the motor is determined prior to the gearhead. The first joint also includes an absolute encoder 152 which determines the rotational position of the output after all of the gears. The absolute encoder is used to determine the position of the link.

The first joint 138 has a first axis 154. The first motor 142, first gearhead 144, first incremental encoder 150, first drive 146 and first absolute encoder 152 are concentric with the pitch axis 154.

The second joint 140 is a linear or prismatic joint includes a first motor 156, a first linear actuator 158. The second joint 140 has a second axis 160. The second motor 156 and second linear actuator 158 are concentric with the second axis 160.

The module housing includes a module base 162 and the first joint 138 and second joint 140 are attached thereto. The module housing further includes a first motor cover 164, a second motor cover 166 and an actuator cover 168 all of which include electromagnetic shielding. An external cable guide 170 is attached to first motor cover 166. External electronic connectors 172 are attached to the external cable guide 170, first motor cover and second motor cover. The external electronic connectors 172 are operably connected to the first joint 138 and the second joint 138.

The two joint modules 80 and 132 may be used in robotic arms. An example of a robotic arm 130 is shown in FIGS. 16 and 17. The modules can be used with a link 136 to form a multi degrees of freedom robotic arm 130. One embodiment of the arm 130 has six degrees of freedom and a reach of 1130 mm. The arm has a mass of 20 kg and a payload capacity of 20 kg. The arm consists of a shoulder and turret joint 134, a shoulder joint 135, a link 136, an elbow and prismatic module 132 and a wrist module 80.

By way of example only the chart below shows the torques that can be generated by the specific joints shown herein. It will be appreciated that the motor size and gear ratios can be varied to achieve the specific torque that is required for a specific application.

| JOINT | MOTOR POWER (W) | GEAR RATIO | TORQUE (NM) |
| --- | --- | --- | --- |
| Turret | 12 | 38400:1 | 73 |
| Shoulder Elbow Module 132 | 25 | 59200:1 | 258 |
| Elbow First Joint | 12 | 50560:1 | 123 |
| Elbow Second Linear Joint Module 80 | 4.8 | not applicable | 200N |
| Wrist First Joint | 12 | 20480:1 | 33 |
| Wrist Second Joint | 15 | 38000:1 | 20 |

The elbow module 132 and shoulder module 134 may be connected with a link 136.

Generally speaking, the systems described herein are directed to two joint modules. As required, specific embodiments are disclosed herein. However, the disclosed embodiments are merely exemplary, and it should be understood that the disclosure may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present disclosure. For purposes of teaching and not limitation, the illustrated embodiments are directed to two joint modules.

As used herein, the terms "comprises" and "comprising" are to construed as being inclusive and opened rather than exclusive. Specifically, when used in this specification including the claims, the terms "comprises" and "comprising" and variations thereof mean that the specified features, steps or components are included. The terms are not to be interpreted to exclude the presence of other features, steps or components.

What is claimed is:

1. A robotic arm comprising:
   a first link having internal link cables extending from one end to an opposed end thereof;
   a first joint operably connected to the first link at one end thereof; the first joint having a hollow drive shaft, an off axis drive and a first joint motor and first joint internal cables extending through the hollow drive shaft;
   a second joint operably connected to the first link, the second joint having an active side, a passive side with electronic connectors, second joint internal cables, and a second joint motor and the active side being mechanically connected to the first link; and
   wherein the link cables and the first joint cables are operably connected, and the electronic connectors of the passive side on the second joint are operably connected to the link cables.

2. The robotic arm of claim 1 wherein the first joint and the second joint each further includes a gearhead and a drive operably connected to the respective motor.

3. The robotic arm of claim 2 wherein each drive is a harmonic drive.

4. The robotic arm of claim 3 wherein each joint further includes absolute encoders and incremental encoders operably connected to the respective motor.

5. The robotic arm of claim 4 wherein each joint further includes torque sensors.

6. The robotic arm of claim 5 wherein power of the joint is in a range between 5 and 50 W, and torque of the joint is in a range between 20 and 826 N/m.

7. The robotic arm of claim 6 wherein the first motor and gearhead is a combination motor and gearhead.

8. The robotic arm of claim 7 wherein one of the first joint and second joint has a joint axis and the motor has a motor axis and motor axis is at an angle to joint axis.

9. The robotic arm of claim 8 wherein the angle is perpendicular.

10. The robotic arm of claim 9 wherein the other of the first motor and the second motor has a motor axis and wherein the one motor axis is parallel the other motor axis.

11. The robotic arm of claim 10 wherein each joint further includes a housing and the housing acts as an electromagnetic shield.

12. The robotic arm of claim 1 further including a second link operably connected to one of the first joint and the second joint.

13. The robotic arm of claim 12 wherein the first joint and the second joint are a combination two joint module.

14. The robotic arm of claim 13 further including a third joint and a fourth joint each operably connected to the second link.

15. The robotic arm of claim 14 wherein the third joint and the fourth joint are a combination two joint module.

16. The robotic arm of claim 15 further including a fifth joint and a sixth joint.

17. The robotic arm of claim 16 wherein the fifth joint and the sixth joint are a combination two joint module.

* * * * *